(12) United States Patent
Nanba

(10) Patent No.: US 6,903,878 B2
(45) Date of Patent: Jun. 7, 2005

(54) ZOOM LENS AND IMAGE PICKUP APPARATUS

(75) Inventor: Norihiro Nanba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 10/210,636

(22) Filed: Aug. 1, 2002

(65) Prior Publication Data

US 2003/0107820 A1 Jun. 12, 2003

(30) Foreign Application Priority Data

Aug. 3, 2001 (JP) ........................................ 2001-236283

(51) Int. Cl.⁷ ............................................. G02B 15/14
(52) U.S. Cl. ....................... 359/680; 359/682; 359/689
(58) Field of Search ................................ 359/689, 683, 359/680, 681, 682

(56) References Cited

U.S. PATENT DOCUMENTS

| | | | |
|---|---|---|---|
| 4,647,160 A | 3/1987 | Ikemori ........................ | 359/680 |
| 4,810,072 A | 3/1989 | Takahashi .................... | 359/689 |
| 4,824,223 A | 4/1989 | Doctor et al. ............... | 359/689 |
| 4,838,666 A | 6/1989 | Shiraishi ..................... | 359/639 |
| 4,999,007 A | 3/1991 | Aoki et al. .................. | 359/676 |
| 5,270,863 A | 12/1993 | Uzawa ........................ | 359/682 |
| 5,872,660 A | 2/1999 | Kohno et al. ................ | 359/689 |
| 6,154,322 A | 11/2000 | Nakayama ................... | 359/691 |
| 6,308,011 B1 | 10/2001 | Wachi et al. ................ | 396/72 |
| 2003/0099043 A1 * | 5/2003 | Takeuchi et al. ............. | 359/680 |
| 2003/0117716 A1 * | 6/2003 | Sekita ......................... | 359/680 |
| 2003/0133202 A1 * | 7/2003 | Watanabe et al. ........... | 359/689 |

FOREIGN PATENT DOCUMENTS

| | | |
|---|---|---|
| JP | 62-200316 | 9/1987 |
| JP | 63-135913 | 6/1988 |
| JP | 2-118509 | 5/1990 |
| JP | 3-288113 | 12/1991 |
| JP | 6-94996 | 4/1994 |
| JP | 6-40170 | 5/1994 |
| JP | 7-3507 | 1/1995 |
| JP | 7-261083 | 10/1995 |
| JP | 9-211326 | 8/1997 |
| JP | H9 (1997)-258103 | 10/1997 |
| JP | 11-305125 | 11/1999 |
| JP | 2000-111798 | 4/2000 |

OTHER PUBLICATIONS

English Abstract of H9(1997)–258103 (Item A) from JPO.
Copy of Office Action dated May 21, 2004 issued in counterpart Application No. 2001–236283 pending in the Japanese Patent Office.
Translation of Office Action dated May 21, 2004 issued in counterpart Application No. 2001–236283 pending in the Japanese Patent Office (Item BB).

* cited by examiner

Primary Examiner—Georgia Epps
Assistant Examiner—M. Hasan
(74) Attorney, Agent, or Firm—Morgan & Finnegan, LLP

(57) ABSTRACT

A zoom lens which suppresses variations of an exit pupil and is telecentric on the image side in the whole range of zooming comprises, from the object side toward the image side: a first negative in optical power, an aperture stop, a second lens unit positive in optical power and a third lens unit positive in optical power. In zooming from the wide angle end to telephoto end, the distance between the first lens unit and the aperture stop narrows, the between the aperture stop and the second lens unit narrows, and the between the second lens unit and the third lens unit widens; and the condition: $0 < (D_w - D_t)/f_w < 1$ is satisfied, where is the distance between aperture stop and the second lens unit at the wide angle end is $D_w$, at the telephoto end is $D_t$ and the focal length at the wide angle end $f_w$.

15 Claims, 16 Drawing Sheets

ZOOM LENS AND IMAGE PICKUP APPARATUS

BACKGROUND OF THE INVENTION

1. Field of the Invention

The present invention relates to a zoom lens, and more particularly to a zoom lens suitable for an image pickup apparatus using a solid-state image pickup element or the like.

2. Description of the Related Art

Along with the functional sophistication of video cameras and digital cameras using solid-state image pickup elements, the optical systems used in those cameras are also called on to be further sophisticated in performance and reduced in size at the same time.

This kind of camera is required to have a lens system having a relatively long back focus because various optical members including a low pass filter and a color correction filter have to be arranged between the rear end of the lens system and the image pickup element. Furthermore, in a camera using a color pickup element, the lens system should preferably excel in telecentric characteristics on the image side in order to avoid color shading.

According to the prior art, there have been proposed various zoom lenses of the so-called short zoom type, having two lens units, negative and positive. In such a short zoom type optical system, the variation of magnification is achieved by moving the positive second lens unit, and the compensation for variation of the image point position by the variation of magnification is achieved by moving the negative first lens unit.

Further examples in pursuit of both higher performance and smaller size include attempts at correcting for aberrations by arranging a negative or positive third lens unit on the image side, described in the Japanese Patent Publication No. 7-3507 (corresponding to the U.S. Pat. No. 4,810,072) and the Japanese Patent Publication No. 6-40170 (corresponding to the U.S. Pat. No. 4,647,160). However, since these lens systems are mainly designed for use with 35 mm photographic films, they can be hardly considered compatible with the long back focus and superior telecentric characteristics required of optical systems using solid-state image pickup elements.

Zoom lens systems satisfying the back focus and telecentric requirements include the optical systems each having three lens units, negative, positive and positive, described in the Japanese Patent Laid-Open No. 63-135913 (corresponding to the U.S. Pat. No. 4,838,666) and the Japanese Patent Laid-Open No. 7-261083. The Japanese Patent Laid-Open No. 3-288113 (corresponding to the U.S. Pat. No. 5,270,863) also discloses an optical system having three negative-positive-positive lens units with the negative lens unit being fixed and the positive second lens and third lens units being moved to achieve the variation of magnification. These examples of the prior art, however, involve the drawbacks of a relatively large number of single lenses constituting each lens unit, a great overall length of the lens system and a high manufacturing cost.

In another example described in the Japanese Patent Laid-Open No. 7-261083, a convex lens is arranged as the closest lens of a negative first lens unit toward the object, and this involves the disadvantage that the outer diameter of the lenses is inevitably increased particularly when the angle of field is widened. Moreover in this example, as an object at a short distance is focused on by moving the negative first lens unit, this arrangement combines with the movement for zooming to complicate the mechanical structure.

In the U.S. Pat. No. 4,999,007 is disclosed a configuration of three negative-positive-positive lens units, wherein the first lens unit and the second lens unit are composed of one single lens each. However, as the overall length of the lens system at the wide angle end is relatively great and a wide gap between the first lens unit and the aperture-stop at the wide angle end results in a great incidence height of off-axis light rays, this configuration invites an increase in the diameter of the lens constituting the first lens unit with the adverse consequence of a large overall size of the lens system.

Moreover, since the first lens unit and the second lens unit consist of single lens, respectively, the correction of aberrations within the lens unit is insufficient. In particular, whereas variations in chromatic aberration of magnification in the process of zooming are more likely than elsewhere to occur in the first lens unit wherein the height of off-axis light rays from the optical axis varies more greatly, as the first lens unit consists of single concave lens, no correction is done within the lens unit, further inviting a problem that the chromatic aberration of magnification varies greatly in the whole system as well.

Furthermore, as a peculiar problem with expanding the angle of view at the wide angle end of zooming, there is a shortage of insufficient correction of distortion. Where use with a high pixel image pickup element of a relatively low sensitivity level is intended, an even greater aperture ratio is required.

In the U.S. Pat. No. 4,824,223, there is disclosed an optical system for use in projectors having a configuration of three negative-positive-positive lens units. As the first lens unit in this lens system consists of single negative lens, there is no correction of aberrations within the lens unit, and the variable magnification ratio is no more than 1.7 or so.

In view of these problems, the assignee of the present application disclosed in the Japanese Patent Laid-Open No. 2000-111798 (corresponding to the U.S. Pat. No. 6,308, 011), an image pickup lens system having a configuration of three negative-positive-positive lens units. This image pickup lens system, while securing both a required lens-back space for inserting a filter or the like and the telecentric performance required for a solid-state image pickup element, is minimized in overall length while keeping a variable magnification ratio of no less than 2, resulting in a compact zoom lens.

In the zoom lens according to the Japanese Patent Laid-Open No. 2000-111798, the aperture stop, together with the second lens unit mainly accountable for the magnification varying action, moves toward the object side in the zooming from the wide angle end to the telephoto end. This results in a wide difference between the wide angle end and the telephoto end in the distance between the aperture stop and the image plane, and accordingly in greater susceptibility to variations of the exit pupil. There is a problem that, especially when the variable magnification ratio is raised, the exit pupil varies more because the moving distance of the second lens unit is increased.

The Japanese Patent Laid-Open No. 6-94996 discloses a configuration of three negative-positive-positive lens units, in which an aperture stop fixed during the process of zooming is arranged between the first lens unit and the second lens unit to keep exit pupil variations relatively small. However, because the aperture stop is fixed during the process of zooming, it is necessary to secure a longer distance between the aperture stop and the second lens unit than the moving distance of the second lens unit, and this gives rise to a problem that the overall optical length at the wide angle end is increased. There is a further problem that the lens diameter of the second lens unit increases because the second lens unit is relatively far from the aperture stop at the wide angle end.

The Japanese Patent Laid-Open No. 9-211326 also involves similar problems.

According to the Japanese Patent Laid-Open No. 62-200316, in a configuration of three negative-positive-positive lens units, an aperture stop moving toward the object side in zooming from the wide angle end to the telephoto end is arranged between the second lens unit and the third lens unit. This is a flare cut stop for effectively cutting flare light beams in the whole range of variable magnification. What limits the axial light rays are the aperture stop in the second lens unit, and this is unsuitable for a camera using a solid-state image pickup element because exit pupil variations arise in the process of zooming.

Configurations set forth in the Japanese Patent Laid-Open No. 2-118509 and the U.S. Pat. No. 4,810,072 also involve similar problems.

A zoom lens disclosed in the Japanese Patent Laid-Open No. 11-305125 (corresponding to the U.S. Pat. No. 6,154,322) has a configuration of two negative-positive lens units, with the aperture stop being arranged between the first lens unit and the second lens unit to be able to move independent of the second lens unit during the process of zooming. However, there also is a problem that, on account of the absence of a positive third lens unit, the exit pupil itself is not kept at a long enough distance from the image plane. There is a further problem that, because of the configuration having two lens units, the overall optical length is increased especially at the telephoto end by the movement of both the first lens unit and the second lens unit toward the object side in zooming from the wide angle end to the telephoto end.

SUMMARY OF THE INVENTION

An object of the present invention, in view of the disadvantages of the prior art noted above, is to provide a zoom lens permitting the exit pupil to be kept at a long enough distance from the image plane over the full range of zooming.

In order to achieve the object state above, a zoom lens according to the invention comprises, in order from the object side toward the image side, a first lens unit having negative optical power, an aperture stop, a second lens unit having positive optical power and a third lens unit having positive optical power. The first lens unit has a negative meniscus lens in which the concave surface is directed toward the image side and a positive meniscus lens in which the convex surface is directed toward the object side. The second lens unit has at least one positive lens and at least one negative lens.

In zooming from the wide angle end to the telephoto end, the distance between the first lens unit and the aperture stop narrows, that between the aperture stop and the second lens unit narrows, and that between the second lens unit and the third lens unit widens; and the following condition is satisfied:

$$0<(Dw-Dt)/fw<1$$

where Dw is the distance between the aperture stop and the second lens unit at the wide angle end; Dt, that between the aperture stop and the second lens unit at the telephoto end; and fw, the focal length at the wide angle end.

Specific modes of implementing the present invention will be disclosed with reference to the embodiments thereof to be described below.

DETAILED DESCRIPTION OF THE PREFERRED EMBODIMENTS

Figure 1:
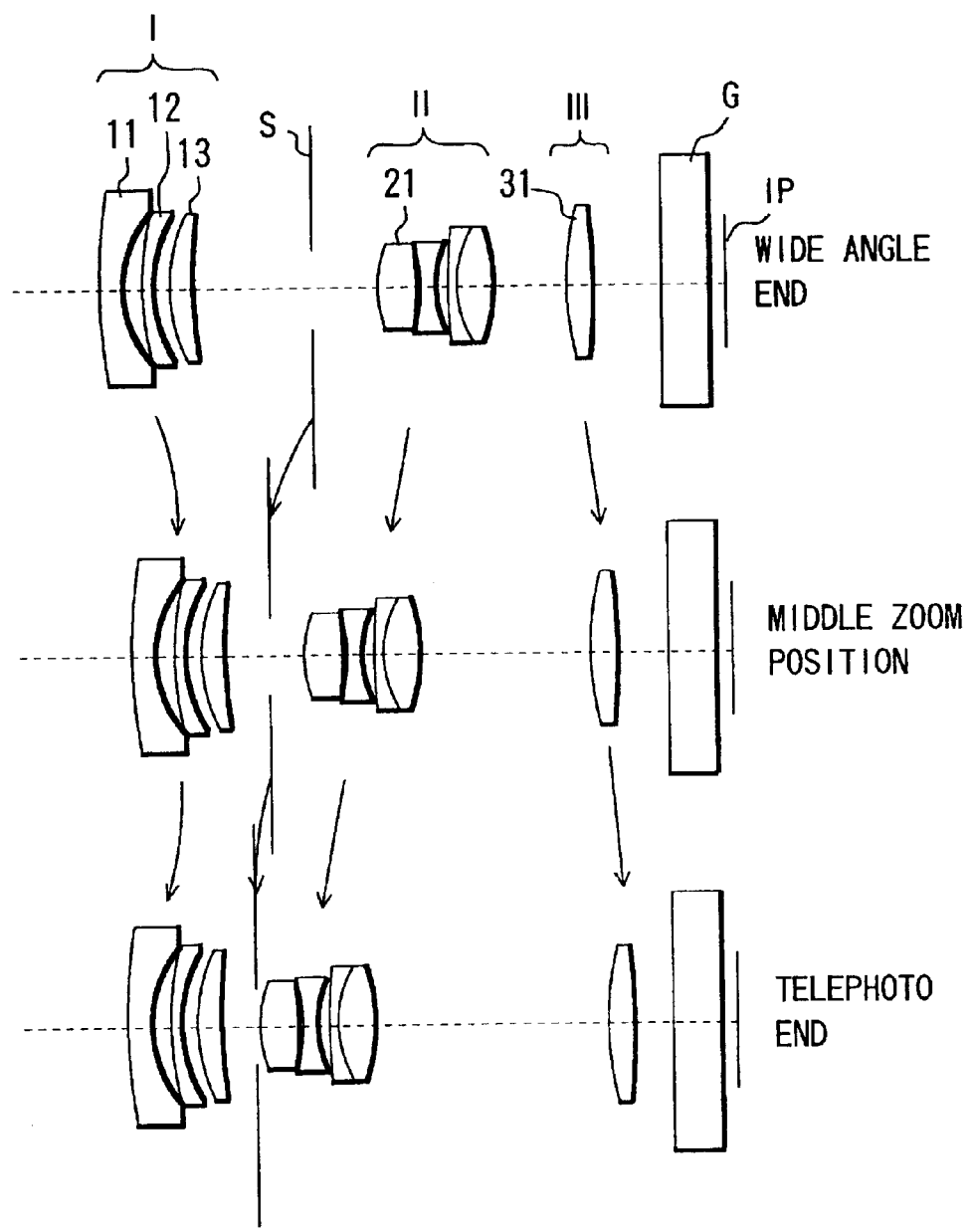
FIG. 1 shows a cross section of lenses in the zoom lens of a embodiment (Numerical Example 1) of the present invention.

Hereinafter, preferred embodiments of the invention will be described in detail with reference to the drawings.

FIGS. 1, 5, 9, 13 and 17 show sectional views of zoom lenses respectively corresponding to the Numerical Examples 1 through 5 to be described below. Each of the zoom lenses of these embodiments of the invention has, in order from the object side, a first lens unit I which has negative optical power (optical power is reciprocal of the focal length), a second lens unit II which has positive optical power and a third lens unit III which has positive optical power.

In zooming from the wide angle end to the telephoto end, the first lens unit I performs a convex reciprocating movement toward the image side or part of such a movement, the second lens unit II moves toward the object, and the third lens unit III either moves or is stationary. There further is an aperture stop S between the first lens unit I and the second lens unit II, and this aperture stop S moves toward the object side in zooming from the wide angle end to the telephoto end.

The configuration regarding the distance between each pair of successive elements is such that, in zooming from the wide angle end to the telephoto end, the distance between the first lens unit I and the aperture stop S is narrowed, that between the aperture stop S and the second lens unit II in narrowed, and that between the second lens unit II and the third lens unit III is widened.

In each of the zoom lenses of these embodiments of the invention, basically the negative first lens unit I and the positive second lens unit II constitute a so-called wide angle short zoom system; the variation of magnification is accomplished by moving the positive second lens unit II, and the movement of the image point along with zooming is compensated by the reciprocating movement of the negative first lens unit I.

Reference character G denotes a glass plate which, as a design element corresponds to a low pass filter or a color correction filter, and IP, an image plane on which the light receiving surface of a solid-state image pickup element (photoelectric conversion element), such as a CCD or a MOS sensor, is placed.

The third lens unit III is positive in optical power. Telecentric image formation on the image side, which is particularly required in an image pickup apparatus using a solid-state image pickup element or the like, is accomplished by assigning the role of a field lens to the third lens unit III.

When the third lens unit III is to move during the process of zooming, since the height of off-axis light rays from the optical axis, coming incident on the third lens unit III can be controlled, the correction capability against various off-axis aberrations is enhanced, resulting in further improved performance over the whole zooming range.

When the third lens unit III is to move from the wide angle end to the telephoto end toward the image side, the lateral magnification β3 of the third lens unit III increases on the telephoto side. This feature contributes to reducing the overall size of the lens system, because the moving distance of the second lens unit II can be shortened as much as the third lens unit III can share the load of zooming.

When the third lens unit III is to move from the wide angle end to the telephoto end toward the object side, the focus sensitivity becomes greater on the telephoto side. As the amount of movement for focusing on a specific subject is greater on the wide angle side than on the telephoto side, the time taken to come into focus is longer on the telephoto side if the focusing lens is driven at the same speed, this configuration provides an effect to make focusing even quicker on the telephoto side.

In these embodiments, the increase of the outer diameter of the lenses constituting the first lens unit I is suppressed by positioning the aperture stop S on the object side of the second lens unit II to shorten the distance between the entrance pupil at the wide angle end and the first lens unit I. And at the same time, satisfactory optical performance is obtained without increasing the number of the constituent lenses by canceling various off-axial aberrations by means of the first lens unit I and the third lens unit III with the aperture stop S disposed therebetween, on the object side of the positive second lens unit II.

The zoom lens of any of these embodiments of the invention, in the process of zooming, keeps the exit pupil, which is apt to approach the image plane IP especially at the wide angle end, away from the image plane IP, by moving the aperture stop S and the second lens unit II independent of each other.

According to the prior art, an aperture stop would be arranged immediately before (on the object side of) the second lens unit II, but in these embodiments, the aperture stop S is arranged closer to the object side than the second lens unit II at the wide angle end and the distance between the aperture stop S and the image plane IP is thereby increased to keep the exit pupil away from the image plane IP. Moreover, as the spacing between the first lens unit I and the aperture stop S is made shorter than that of the prior art, the outer diameter of the lenses of the first lens unit I can be decreased, making it possible to provide a more compact zoom lens.

At the telephoto end, the aperture stop S is arranged immediately before the second lens unit II similarly to the prior art. Since moving the aperture stop S and the second lens unit II with the spacing between them at the wide angle end as it is would result in an extended overall lens length at the telephoto end, it is desirable from the viewpoint of size reduction that the first lens unit I and the aperture stop S as well as the aperture stop S and the second lens unit II be arranged respectively adjacent to each other.

Further in zooming from the wide angle end to the telephoto end, it is desirable for the aperture stop S to move toward the object side. If the aperture stop S is kept stationary during the process of zooming, it will be necessary to arrange the aperture stop S and the second lens unit II at the wide angle end at a distance longer than that of the movement of the second lens unit II, but this is undesirable for making the system more compact, because it would invite an increase in the overall lens length at the wide angle end as well as in external lens diameter of the second lens unit II. If the aperture stop S is moved toward the image side in zooming from the wide angle end to the telephoto end, this is disadvantageous to compactness and therefore be undesirable.

In any of these embodiments of the invention, by moving the aperture stop S toward the object side in zooming from the wide angle end to the telephoto end, the effect to keep the exit pupil away from the image plane IP at the wide angle end and a reduction in the overall lens length at the telephoto end are achieved at the same time.

Further it is desirable that the locus of movement of the aperture stop S is bulgy (convex) toward the object side in zooming from the wide angle end to the telephoto end. If both the aperture stop S and the second lens unit II are moved from the wide angle end to the telephoto end in linear loci, the exit pupil will tend to become close to the image face IP in a middle zoom position. This effect originates from the weakening at the wide angle end, the effect to keep the exit pupil away from the image plane IP, when in the middle zoom position. To make up for this weakening of the effect, it is desirable to obtain a bulgy locus positioned closer to the object side in the middle zoom position than a linear locus.

The negative first lens unit I has a role, which allows an off-axis principal ray to form an image of the pupil on the center of aperture stop. Especially on the wide angle side, where the amount of refraction of the off-axis principal ray is large, various off-axis aberrations, particularly astigmatism and distortion, are apt to arise.

In view of this problem, here is used, like the configuration of a usual wide angle lens, a negative-positive arrangement, which is the most effective in suppressing an increase of the diameter of the lens closest to the object side. The lenses constituting the first lens unit I are shaped very close to concentric spherical curves around the center of the aperture stop for suppressing the occurrence of off-axis aberrations due to the refraction of the off-axis principal ray. That is, a negative lens 11 and a negative lens 12 have meniscus shapes in which the concave surfaces are directed toward the image side, and a positive lens 13 has a meniscus shape in which the convex surface is directed toward the object side.

A positive lens 21, which is the closest to the object side in the second lens unit II, is convex toward the object side so that the off-axis principal ray emitted from the first lens unit I may not be greatly refracted to give rise to various off-axis aberrations. It is also desirable for the positive lens 21 to be convex toward the object side in order to suppress the occurrence of spherical aberrations in respect of the axial light rays emitted from the first lens unit I in a divergent state.

Also in these embodiments of the invention, aspheric surfaces are effectively utilized to achieve further enhancement of optical performance while composing each lens unit of a smaller number of lenses.

More specifically, the image side surface of the negative lens 11 constituting part of the first lens unit I is shaped in an aspheric surface in which divergent effect weakens on the periphery, and thereby curvature of field, astigmatism and distortion especially occurring on the wide angle side are corrected to reduce variations in aberration which arise along with the variation of magnification.

The object side surface of the positive lens 21 constituting part of the second lens unit II is shaped in an aspheric surface in which convergent effect weakens on the periphery, and thereby aspheric aberrations, which become more conspicuous with an increase in lens diameter, are effectively corrected.

The object side surface of a positive lens 31 constituting part of the third lens unit III is shaped in an aspheric surface in which convergent effect weakens on the periphery, and thereby curvature of field, astigmatism and distortion are effectively corrected in the whole range of variable magnification.

Further, the zoom lens of any of these embodiments of the inventions satisfies the following Conditional Expressions:

$$0 < (Dw - Dt)/fw < 1 \quad (1)$$

$$MS2/MP2 < MS1/MP1 \quad (2)$$

$$0.4 < MS/fw < 1.8 \quad (3)$$

where $fw$ is the focal length at the wide angle end; $Dw$, the distance between the aperture stop S and the second lens unit II at the wide angle end; $Dt$, the distance between the aperture stop S and the second lens unit II at the telephoto end; MS1, the amount (length) of movement of the aperture stop S from the wide angle end to any position within the zoom range except for the wide angle end and the telephoto end; MS2, amount of movement from the abovementioned any position within the zoom range to the telephoto end; MP1, the amount of movement of the second lens unit II positive in optical power from the wide angle end to the abovementioned any position within the zoom range; MP2, the amount of movement from the abovementioned any position within the zoom range to the telephoto end; and MS, the amount of movement of the aperture stop S from the wide angle end to the telephoto end.

Conditional Expression (1) defines the difference between the wide angle end and the telephoto end with respect to the spacing between the aperture stop S and the second lens unit II. In particular where the spacing between the aperture stop S and the second lens unit II at the telephoto end is set to be shorter in consideration of the overall lens length, it defines the spacing between the aperture stop S and the second lens unit II at the wide angle end.

If the spacing between the aperture stop S and the second lens unit II widens at the wide angle end beyond the upper limit of Conditional Expression (1), the effect to keep the exit pupil away from the image plane IP strengthens, but the outer diameter of lenses of the second lens unit II increases, which is a disadvantage to making the system more compact. Or if the spacing between the aperture stop S and the second lens unit II narrows at the wide angle end beyond the lower limit of Conditional Expression (1), the effect to keep the exit pupil away from the image plane IP weakens, and this is against the essential object of the invention and therefore undesirable.

Conditional Expression (2) defines the loci of movements of the aperture stop S and the second lens unit II. MS2/MP2=MS1/MP1 means the movement of the aperture stop S and the second lens unit II at a constant rate in the process of zooming; MS2/MP2<MS1/MP1, the aperture stop S moves in a convex locus toward the object side when the locus of the second lens unit II is linear; and MS2/MP2>MS1/MP1, conversely, the aperture stop S moves in a convex locus toward the image plane IP when the locus of the second lens unit II is linear.

As stated above, in any of these embodiments of the invention, the aperture stop S moves in a convex locus toward the object side to provide an effect to keep the exit pupil away from the image plane IP even in the middle zoom position with the result that the exit pupil is kept away from the image plane IP over the full range of zooming.

Conditional Expression (3) defines the amount of movement of the aperture stop S. If the amount of movement is greater than the upper limit, variations of the exit pupil will increase in zooming. In a solid-state image pickup element such as a CCD, usually a micro lens array is arranged to concentrate the incident light on the effective part of pixels. However, since the configuration such that shading be minimized with a specific exit pupil, the shading will increase as the exit pupil moves farther away. It is therefore desirable that the upper limit of Conditional Expression (3) be not exceeded because, for a zoom lens in which the exit pupil varies greatly, shading cannot be satisfactory over the full range of zooming. Going down beyond the lower limit is advantageous as far as exit pupil variations are concerned, but it would be necessary to set the spacing from the second lens unit II at the wide angle end comparable to the required amount of movement of the second lens unit II for the magnification varying action, and this would make the outer diameter of lenses increase, a disadvantage for achieving compactness.

The values of each Conditional Expression in Numerical Examples 1 through 5 will be shown below.

TABLE 1

|  | Numerical Examples | | | | |
|---|---|---|---|---|---|
|  | 1 | 2 | 3 | 4 | 5 |
| Conditional Expression (1) | 0.62 | 0.62 | 0.62 | 0.83 | 0.10 |
| Conditional Expression (3) | 0.65 | 0.65 | 0.65 | 1.33 | 1.13 |

Numerical Examples of the present invention will be shown below. In each Numerical Example, i denotes the position of a given surface in the order counted from the object side; Ri, the radius of curvature of the surface; Di, the thickness or air gap between the i-th and i+1-th surfaces; Ni and vi, the optical index and the Abbe number, respectively, with respect to d-line. The closest two surfaces to the image side are glass blocks corresponding to filter members, such as a quartz low pass filter and an infrared cut filter. Also, B, C, D, E and F are aspheric coefficients. The aspheric shape is represented by the following equation:

$$x = \frac{(1/R)H^2}{1 + \sqrt{1 - (1+K)(H/R)^2}} + BH^4 + CH^6 + DH^8 + EH^{10}$$

where x denotes a displacement with height "H" from the optical axis based on a facial vertex; R, a radius of curvature; and K, a conic constant; ω, a half angle field.

NUMERICAL EXAMPLE 1

Figure 2:
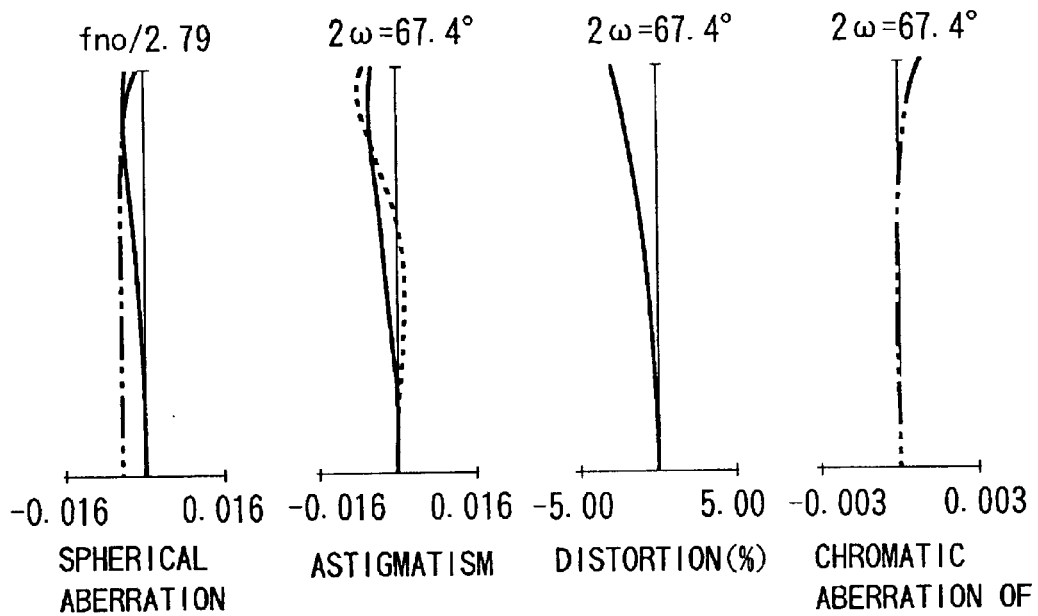
FIG. 2 shows aberrations of the zoom lens of FIG. 1 at the wide angle end.
Figure 3:
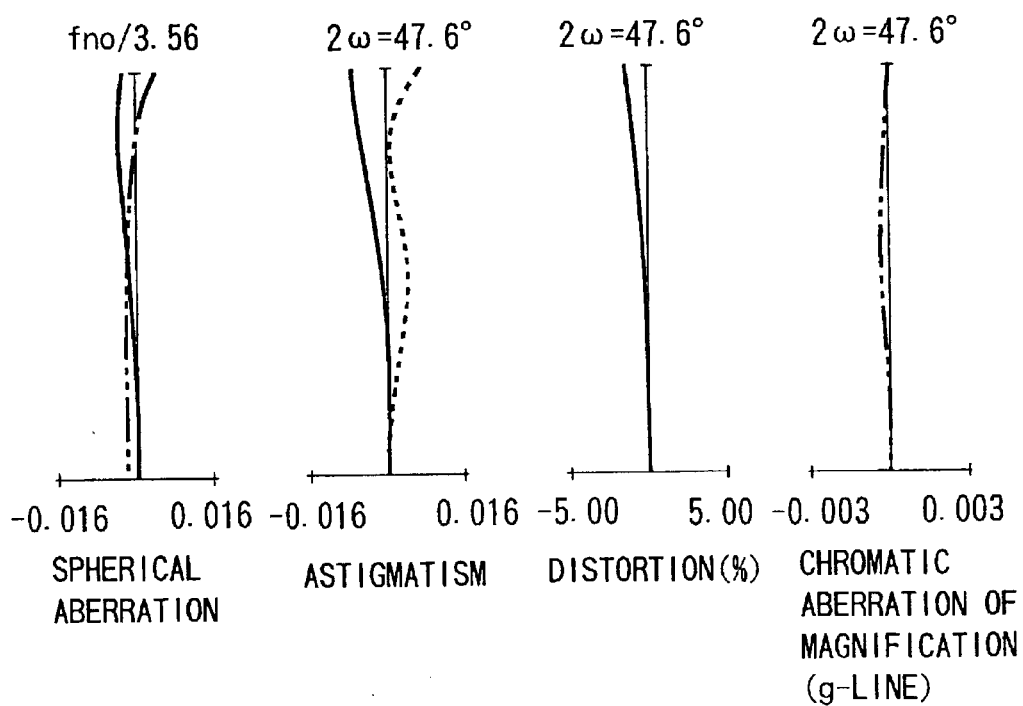
FIG. 3 shows aberrations of the zoom lens of FIG. 1 at a middle zoom position.
Figure 4:
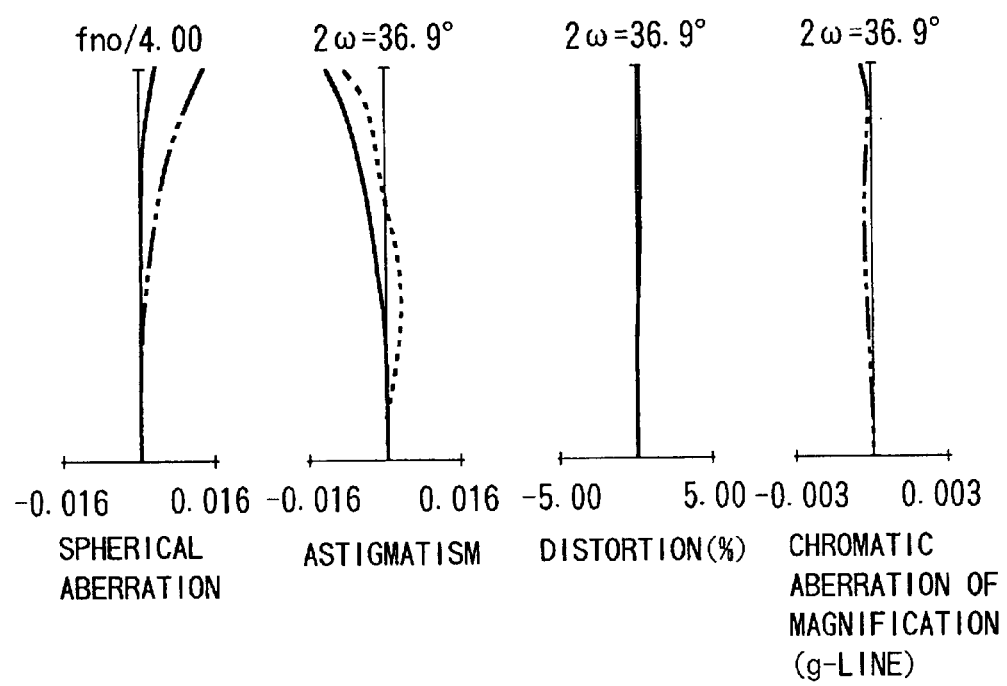
FIG. 4 shows aberrations of the zoom lens of FIG. 1 at the telephoto end.

FIG. 1 shows a cross section of lenses in the zoom lens of Numerical Example 1. FIGS. 2 through 4 show aberrations of the zoom lens of Numerical Example 1 at the wide angle end, in a middle zoom position and at the telephoto end, respectively.

In this Numerical Example, in zooming from the wide angle end to the telephoto end, the first lens unit I reciprocates in a convex shape toward the image side; the second lens unit II moves toward the object side; the third lens unit III moves toward the image side; and the aperture stop S moves toward the object side. The spacing (distance) between the first lens unit I and the aperture stop S varies to become narrower, the spacing between the aperture stop S and the second lens unit II varies to become narrower, and the spacing between the second lens unit II and the third lens unit III varies to become wider.

Lens data are shown below.

| f = 1 – 2.00 | Fno = 2.79 – 4.00 | 2ω = 67.4° – 36.9° | |
|---|---|---|---|
| R 1 = 7.625 | D 1 = 0.21 | N 1 = 1.674700 | ν 1 = 54.9 |
| * R 2 = 1.025 | D 2 = 0.19 | | |
| R 3 = 3.345 | D 3 = 0.10 | N 2 = 1.728250 | ν 2 = 28.5 |
| R 4 = 1.369 | D 4 = 0.16 | | |
| R 5 = 1.608 | D 5 = 0.24 | N 3 = 1.846660 | ν 3 = 23.8 |
| R 6 = 7.128 | D 6 = Variable | | |
| R 7 = Aperture Stop | D 7 = Variable | | |
| * R 8 = 1.053 | D 9 = 0.38 | N 4 = 1.693500 | ν 4 = 53.2 |
| R 9 = –4.113 | D10 = 0.03 | | |
| R10 = –1.721 | D11 = 0.14 | N 5 = 1.516330 | ν 5 = 64.1 |
| R11 = 1.016 | D12 = 0.13 | | |
| R12 = 8.778 | D13 = 0.08 | N 6 = 1.846660 | ν 6 = 23.8 |
| R13 = 0.986 | D14 = 0.35 | N 7 = 1.772499 | ν 7 = 49.6 |
| R14 = –1.696 | D15 = Variable | | |
| * R15 = 2.569 | D16 = 0.25 | N 8 = 1.583130 | ν 8 = 59.5 |
| R16 = –15.873 | D17 = Variable | | |
| R17 = ∞ | D18 = 0.48 | N 9 = 1.516330 | ν 9 = 64.2 |
| R18 = ∞ | | | |
| #Focal length | 1.00 | 1.44 | 2.00 |
| Variable distance # | | | |
| D 6 | 1.15 | 0.51 | 0.34 |
| D 7 | 0.63 | 0.42 | 0.02 |
| D15 | 0.69 | 1.45 | 2.28 |
| D17 | 0.67 | 0.51 | 0.35 |

Aspheric coefficients
R2 k = 0.00000e + 00  B = –1.00800e – 01  C = –4.56168e – 02  D = –4.64309e – 02
E = –4.34339e – 02
R8 k = 0.00000e + 00  B = –4.04050e – 02  C = 1.18055e – 02  D = 0.00000e + 00
E = 0.00000e + 00
R15 k = 0.00000e + 00  B = –4.50357e – 02  C = 8.94264e – 02  D = –1.68278e – 01
E = 1.26814e – 01

NUMERICAL EXAMPLE 2

Figure 5:
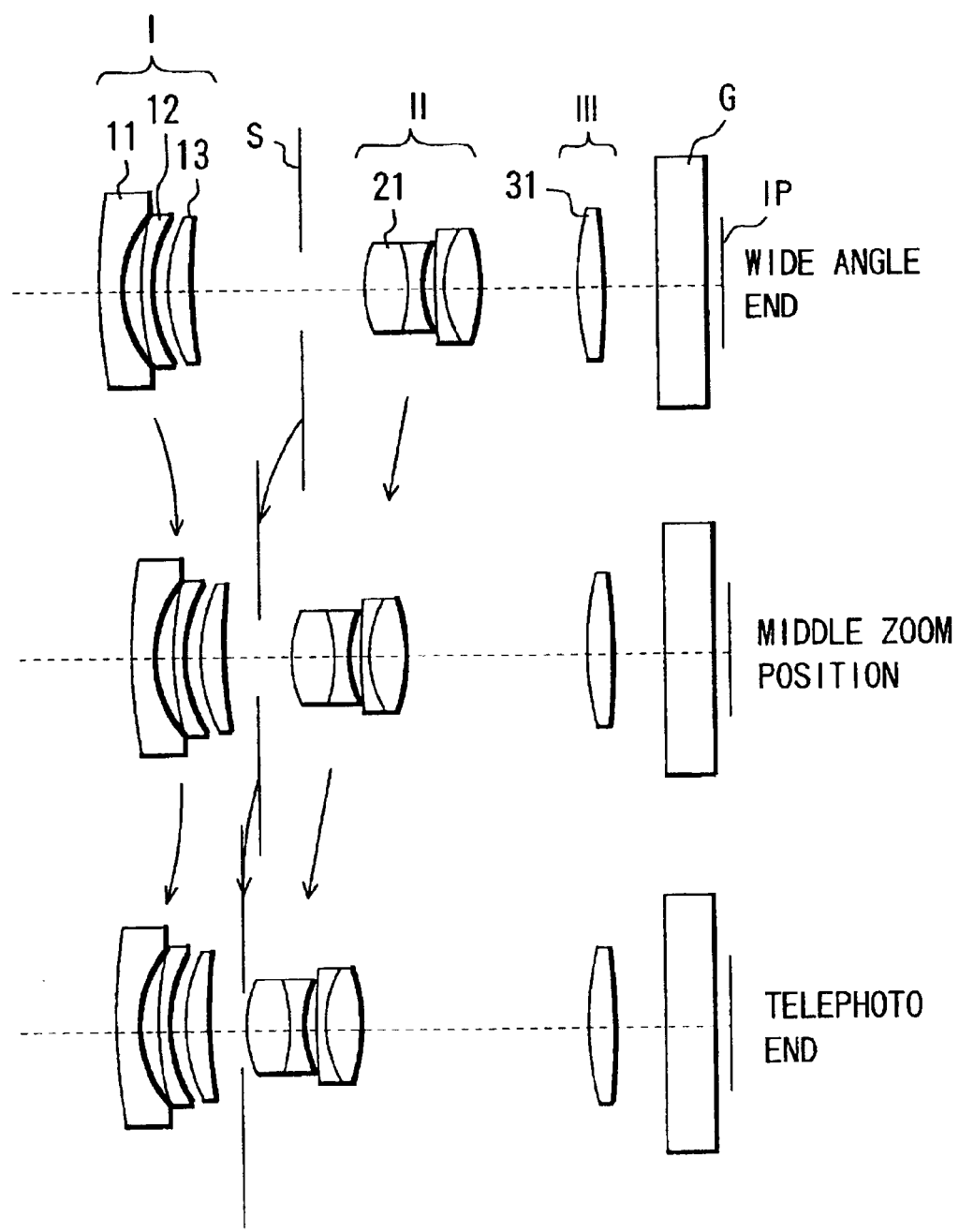
FIG. 5 shows a cross section of lenses in the zoom lens of another embodiment (Numerical Example 2) of the invention.
Figure 6:
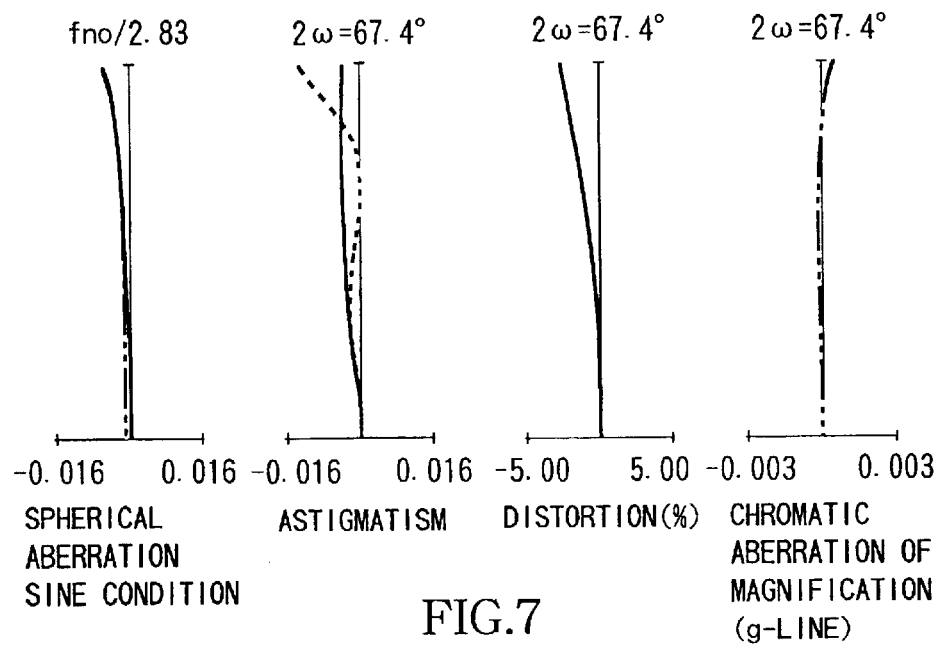
FIG. 6 shows aberrations of the zoom lens of FIG. 2 at the wide angle end.
Figure 7:
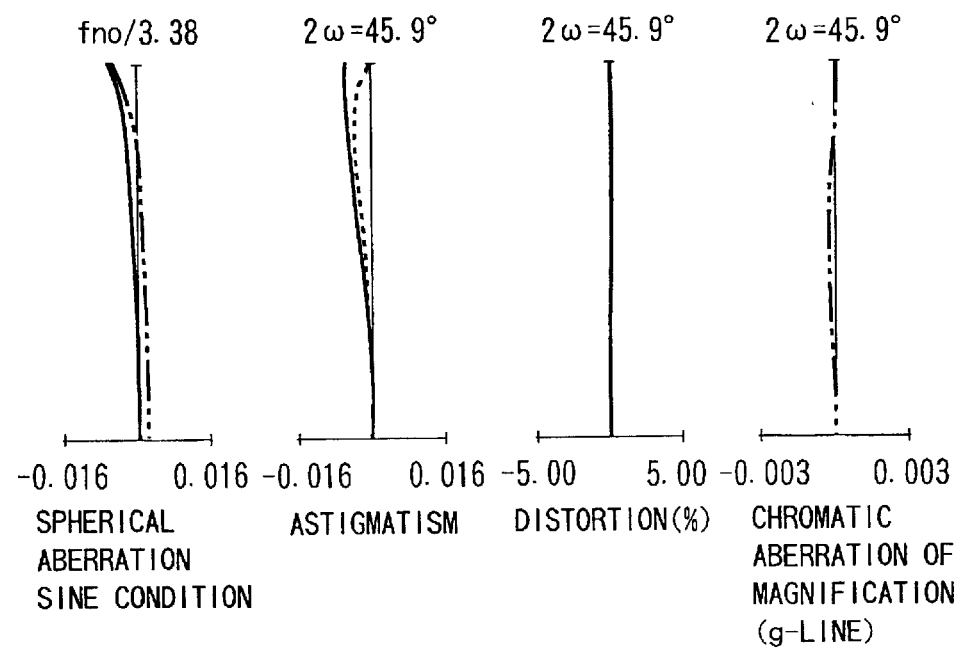
FIG. 7 shows aberrations of the zoom lens of FIG. 2 at a middle zoom position.
Figure 8:
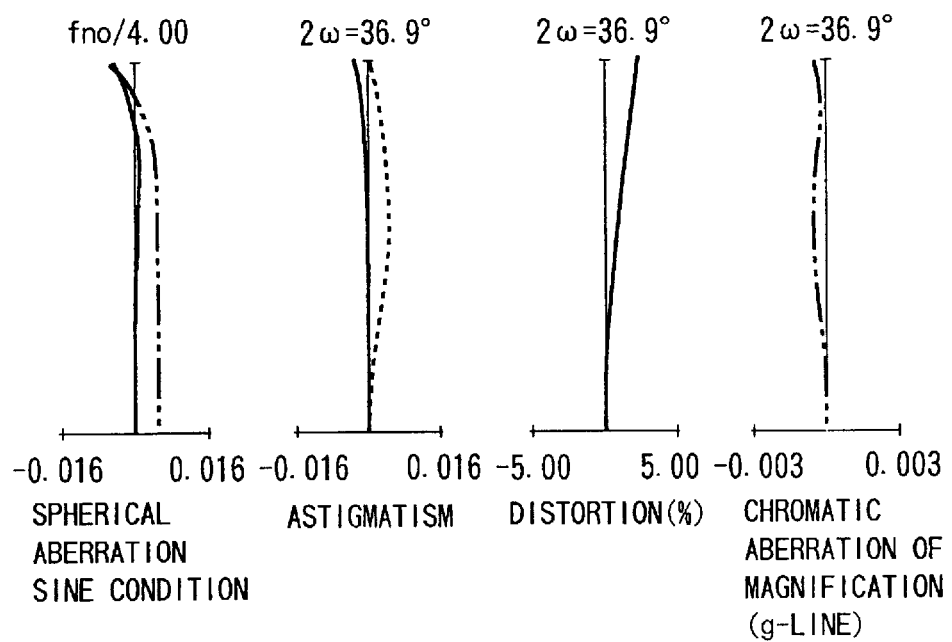
FIG. 8 shows aberrations of the zoom lens of FIG. 2 at the telephoto end.

FIG. 5 shows a cross section of lenses in the zoom lens of Numerical Example 2. FIGS. 6 through 8 show aberrations of the zoom lens of Numerical Example 2 at the wide angle end, in a middle zoom position and at the telephoto end, respectively.

In this Numerical Example, in zooming from the wide angle end to the telephoto end, the first lens unit I reciprocates in a convex shape toward the image side; the second lens unit II moves toward the object side; the third lens unit III is stationary; and the aperture stop S moves toward the object side. The spacing between the first lens unit I and the aperture stop S varies to become narrower, the spacing between the aperture stop S and the second lens unit II varies to become narrower, and the spacing between the second lens unit II and the third lens unit III varies to become wider.

Lens data are shown below.

| f = 1 – 2.00 | Fno = 2.83 – 4.00 | 2ω = 67.4° – 36.9° | |
|---|---|---|---|
| R 1 = 7.625 | D 1 = 0.21 | N 1 = 1.674700 | ν 1 = 54.9 |
| * R 2 = 0.891 | D 2 = 0.19 | | |
| R 3 = 3.196 | D 3 = 0.10 | N 2 = 1.728250 | ν 2 = 28.5 |
| R 4 = 1.381 | D 4 = 0.16 | | |
| R 5 = 1.536 | D 5 = 0.24 | N 3 = 1.846660 | ν 3 = 23.8 |
| R 6 = 5.635 | D 6 = Variable | | |
| R 7 = Aperture Stop | D 7 = Variable | | |
| * R 8 = 0.937 | D 9 = 0.38 | N 4 = 1.693500 | ν 4 = 53.2 |
| R 9 = –4.271 | D10 = 0.08 | N 5 = 1.516330 | ν 5 = 64.1 |
| R10 = 0.817 | D11 = 0.24 | | |
| R11 = 3.790 | D12 = 0.08 | N 6 = 1.846660 | ν 6 = 23.8 |
| R12 = 0.974 | D13 = 0.35 | N 7 = 1.772499 | ν 7 = 49.6 |
| R13 = –3.194 | D14 = Variable | | |
| * R14 = 2.525 | D15 = 0.25 | N 8 = 1.583130 | ν 8 = 59.5 |
| R15 = –30.058 | D16 = Variable | | |
| R16 = ∞ | D17 = 0.48 | N 9 = 1.516330 | ν 9 = 64.2 |
| R17 = ∞ | | | |
| #Focal length | 1.00 | 1.48 | 2.00 |
| Variable distance # | | | |
| D 6 | 1.08 | 0.40 | 0.32 |
| D 7 | 0.63 | 0.42 | 0.02 |

-continued

| | | | |
|---|---|---|---|
| D14 | 0.93 | 1.54 | 2.20 |
| D16 | 0.48 | 0.48 | 0.48 |

Aspheric coefficients
R2 k = 0.00000e + 00 B = −1.49190e − 01 C = −1.94407e − 02 D = −2.42737e − 01
E = −6.80314e − 02
R8 k = 0.00000e + 00 B = −9.57609e − 02 C = 7.26573e − 02 D = 0.00000e + 00
E = 0.00000e + 00
R14 k = 0.00000e + 00 B = −6.29601e − 02 C = 2.97650e − 02 D = −5.15405e − 02
E = 3.26440e − 02

NUMERICAL EXAMPLE 3

Figure 9:
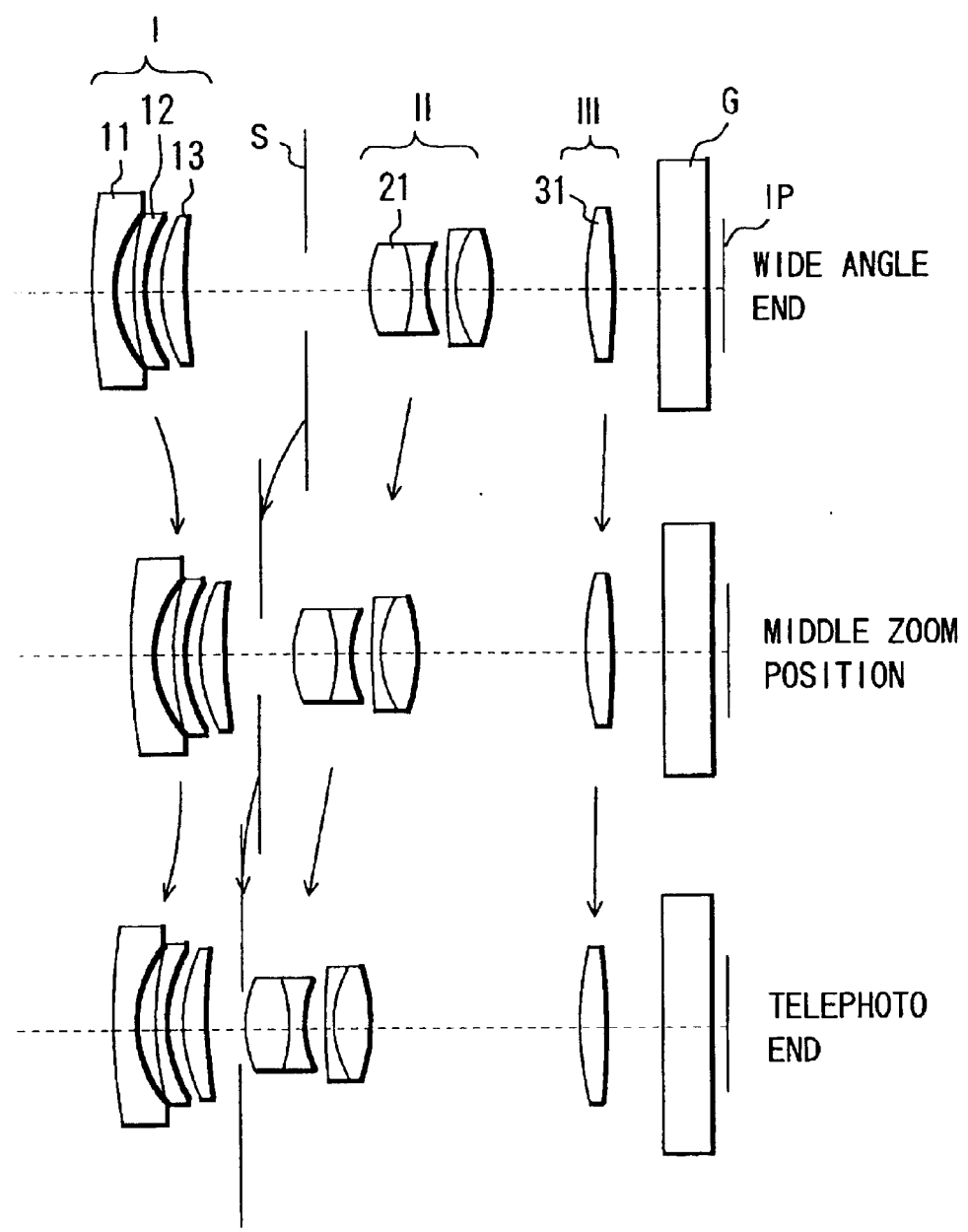
FIG. 9 shows a cross section of lenses in the zoom lens of another embodiment (Numerical Example 3) of the invention.
Figure 10:
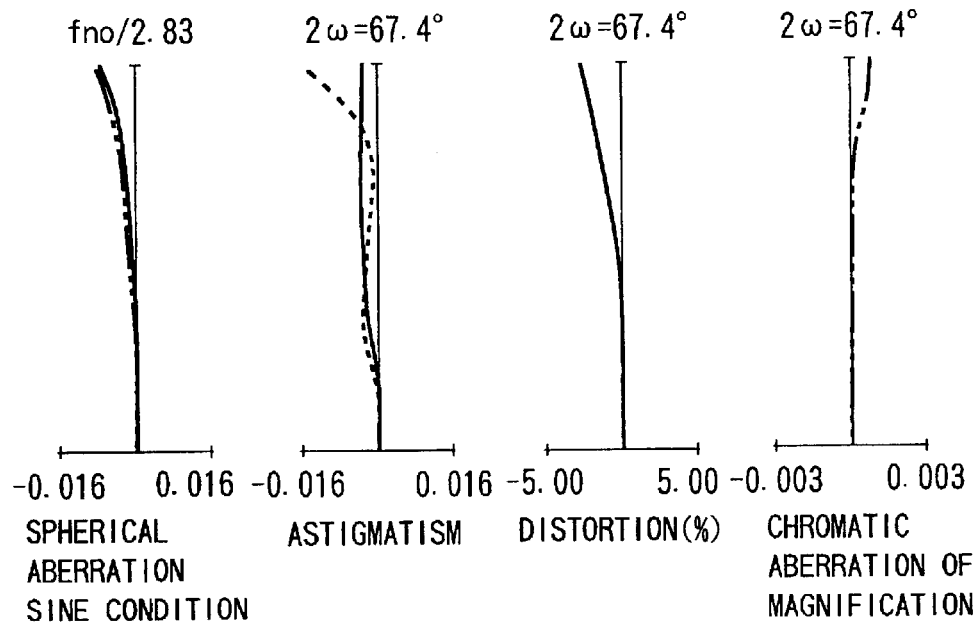
FIG. 10 shows aberrations of the zoom lens of FIG. 9 at the wide angle end.
Figure 11:
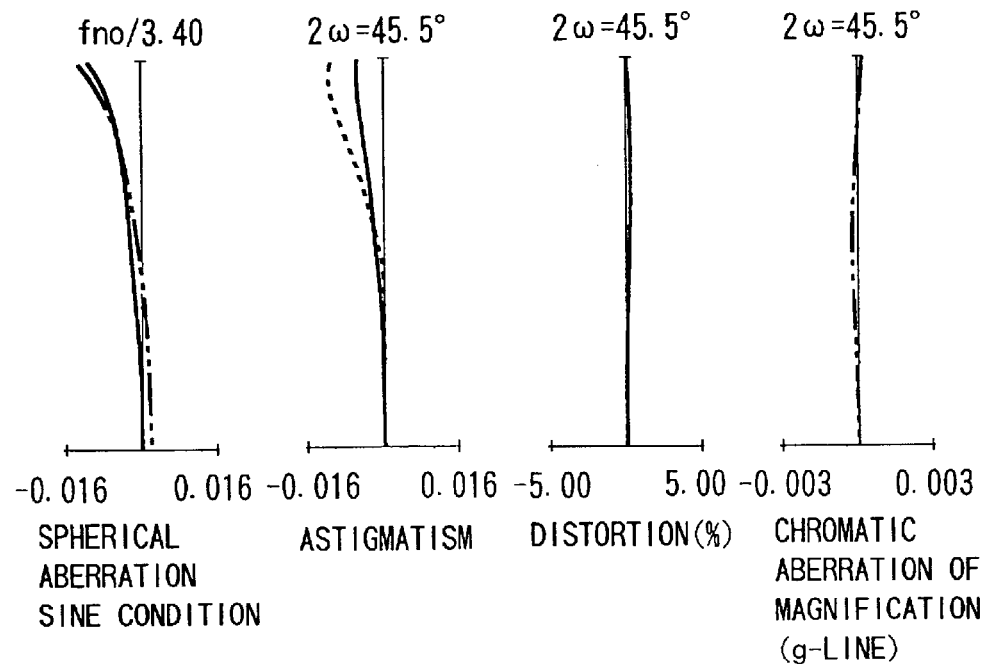
FIG. 11 shows aberrations of the zoom lens of FIG. 9 at a middle zoom position.
Figure 12:
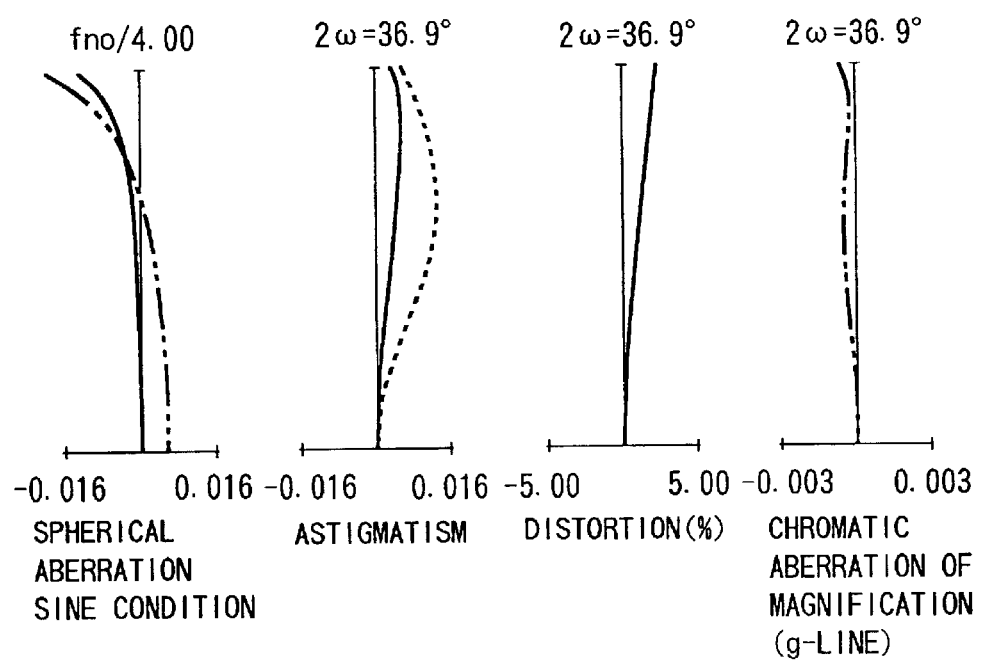
FIG. 12 shows aberrations of the zoom lens of FIG. 9 at the telephoto end.

FIG. 9 shows a cross section of lenses in the zoom lens of Numerical Example 3. FIGS. 10 through 12 show aberrations of the zoom lens of Numerical Example 3 at the wide angle end, in a middle zoom position and at the telephoto end, respectively.

In this Numerical Example, in zooming from the wide angle end to the telephoto end, the first lens unit I reciprocates in a convex shape toward the image side; the second lens unit II moves toward the object side; the third lens unit III moves toward the object side; and the aperture stop S moves toward the object side. The spacing between the first lens unit I and the aperture stop S varies to become narrower, the spacing between the aperture stop S and the second lens unit II varies to become narrower, and the spacing between the second lens unit II and the third lens unit III varies to become wider.

Lens data are shown below.

| f = 1 − 2.00 | Fno = 2.83 − 4.00 | 2ω = 67.4° − 36.9° | |
|---|---|---|---|
| R 1 = 7.626 | D 1 = 0.21 | N 1 = 1.674700 | ν 1 = 54.9 |
| * R 2 = 0.889 | D 2 = 0.19 | | |
| R 3 = 3.001 | D 3 = 0.10 | N 2 = 1.728250 | ν 2 = 28.5 |
| R 4 = 1.283 | D 4 = 0.16 | | |
| R 5 = 1.459 | D 5 = 0.24 | N 3 = 1.846660 | ν 3 = 23.8 |
| R 6 = 5.162 | D 6 = Variable | | |
| R 7 = Aperture Stop | D 7 = Variable | | |
| * R 8 = 0.919 | D 9 = 0.38 | N 4 = 1.693500 | ν 4 = 53.2 |
| R 9 = −2.044 | D10 = 0.08 | N 5 = 1.517417 | ν 5 = 52.4 |
| R10 = 0.774 | D11 = 0.22 | | |
| R11 = 3.028 | D12 = 0.08 | N 6 = 1.846660 | ν 6 = 23.8 |
| R12 = 0.901 | D13 = 0.35 | N 7 = 1.772499 | ν 7 = 49.6 |
| R13 = −4.890 | D14 = Variable | | |
| * R14 = 2.376 | D15 = 0.25 | N 8 = 1.583130 | ν 8 = 59.5 |
| R15 = −29.221 | D16 = Variable | | |
| R16 = ∞ | D17 = 0.48 | N 9 = 1.516330 | ν 9 = 64.2 |
| R17 = ∞ | | | |
| #Focal length | 1.00 | 1.49 | 2.00 |
| Variable distance # | | | |
| D 6 | 1.12 | 0.48 | 0.32 |
| D 7 | 0.63 | 0.34 | 0.02 |
| D14 | 0.98 | 1.51 | 2.09 |
| D16 | 0.41 | 0.48 | 0.57 |

Aspheric coefficients
R2 k = 0.00000e + 00 B = −1.52672e − 01 C = −2.34195e − 02 D = −1.74716e − 01
E = −1.70037e − 01
R8 k = 0.00000e + 00 B = −1.06474e − 01 C = 1.00932e − 01 D = 0.00000e + 00
E = 0.00000e + 00
R14 k = 0.00000e + 00 B = −7.19291e − 02 C = 5.65792e − 02 D = −8.16574e − 02
E = 2.5109e − 02

NUMERICAL EXAMPLE 4

Figure 13:
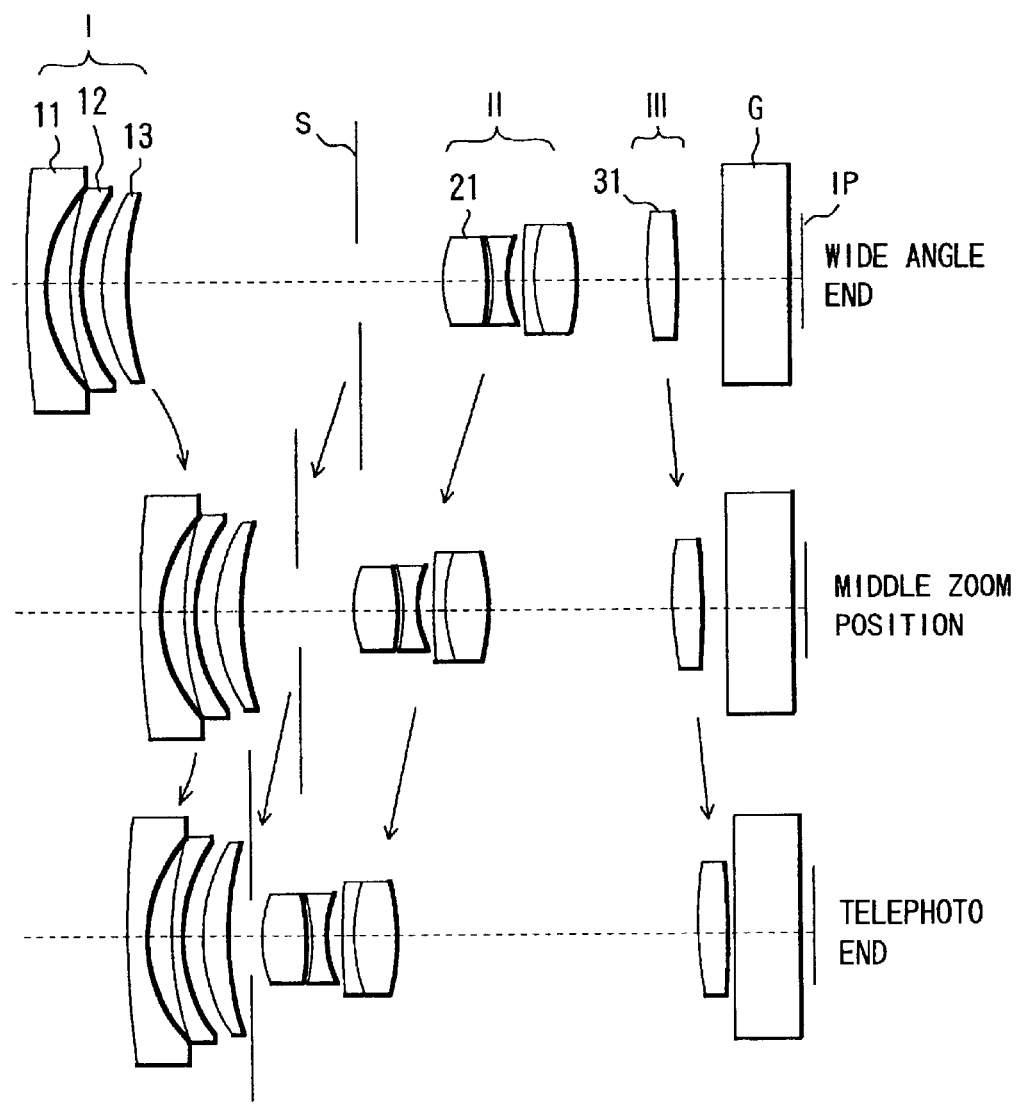
FIG. 13 shows a cross section of lenses in the zoom lens of another embodiment (Numerical Example 4) of the invention.
Figure 14:
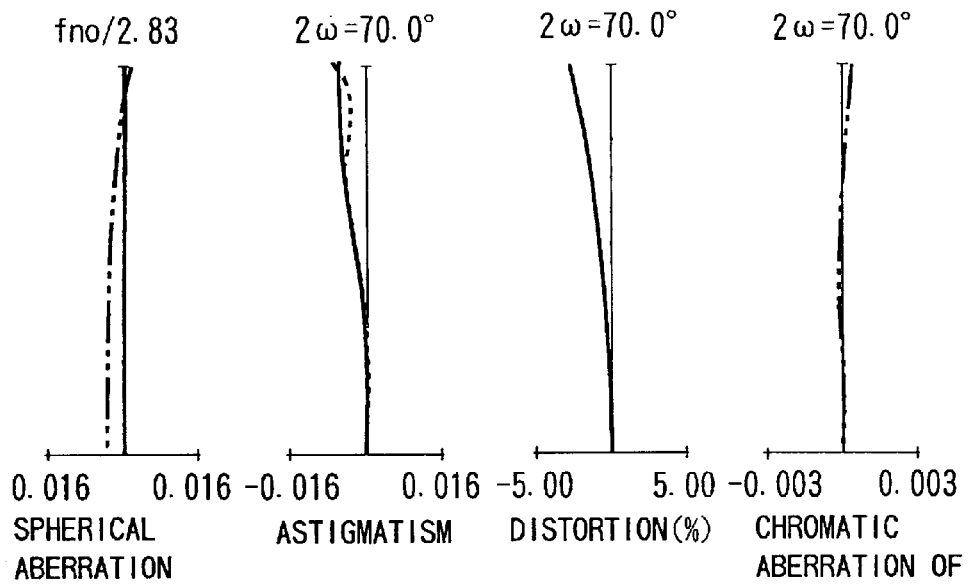
FIG. 14 shows aberrations of the zoom lens of FIG. 13 at the wide angle end.
Figure 15:
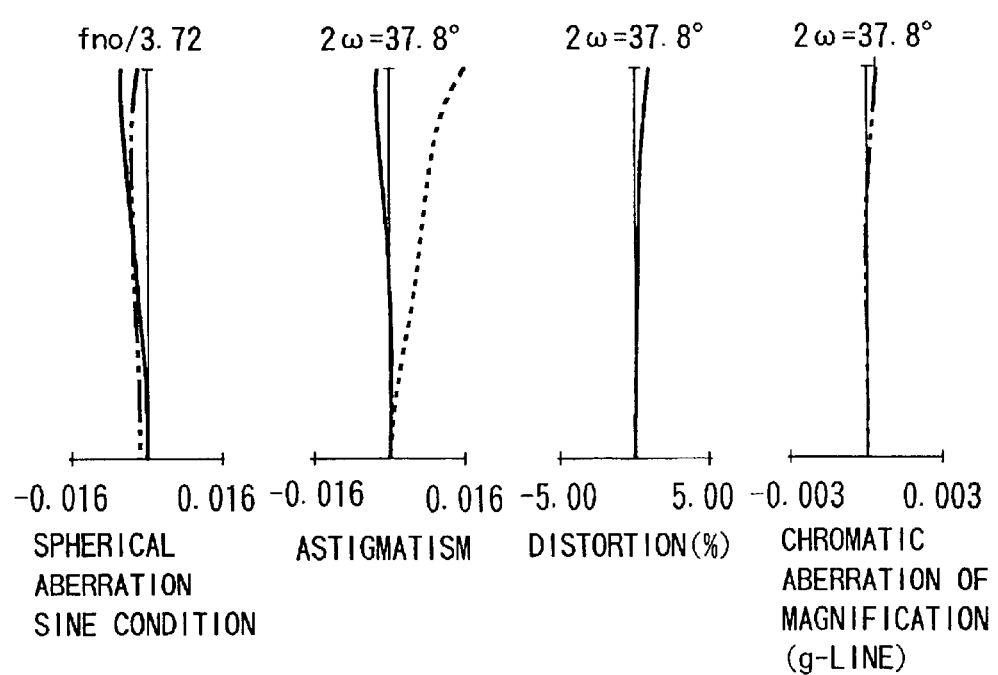
FIG. 15 shows aberrations of the zoom lens of FIG. 13 at a middle zoom position.
Figure 16:
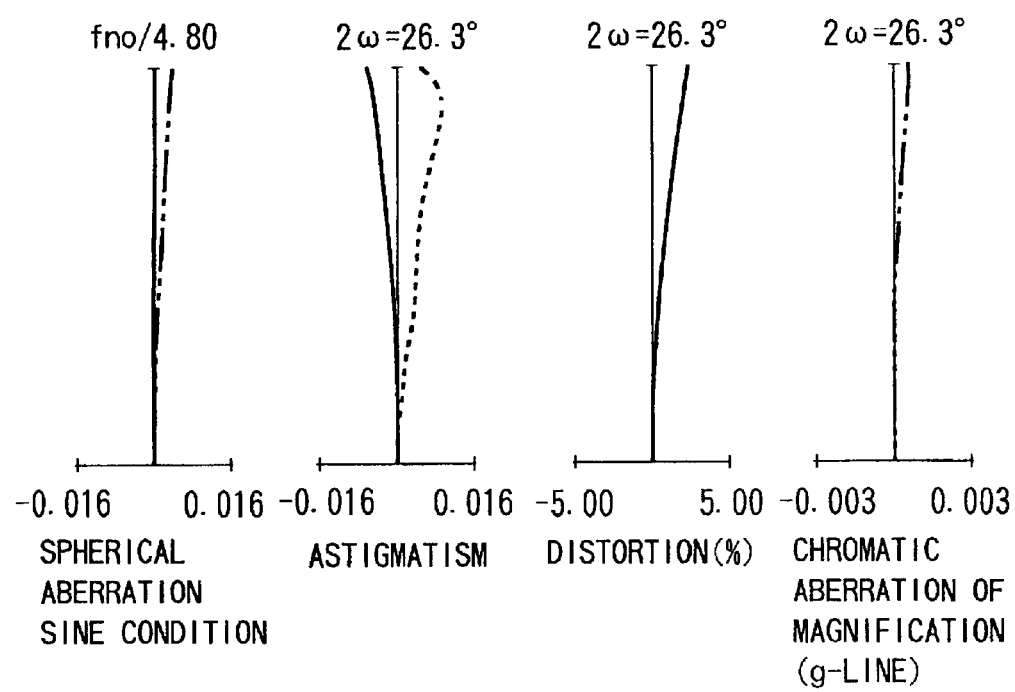
FIG. 16 shows aberrations of the zoom lens of FIG. 13 at the telephoto end.

FIG. 13 shows a cross section of lenses in the zoom lens of Numerical Example 4. FIGS. 14 through 16 show aberrations of the zoom lens of Numerical Example 4 at the wide angle end, in a middle zoom position and at the telephoto end, respectively.

In this Numerical Example, in zooming from the wide angle end to the telephoto end, the first lens unit I reciprocates in a convex shape toward the image side; the second lens unit II moves toward the object side; the third lens unit III moves toward the image side; and the aperture stop S moves toward the object side. The spacing between the first lens unit I and the aperture stop S varies to become narrower, the spacing between the aperture stop S and the second lens unit II varies to become narrower, and the spacing between the second lens unit II and the third lens unit III varies to become wider.

Lens data are shown below.

| f = 1 − 3.00 | Fno = 2.83 − 4.80 | 2ω = 70.0° − 26.3° | |
|---|---|---|---|
| R 1 = 11.529 | D 1 = 0.22 | N 1 = 1.674700 | ν 1 = 54.9 |
| * R 2 = 1.471 | D 2 = 0.27 | | |
| R 3 = 3.362 | D 3 = 0.13 | N 2 = 1.743997 | ν 2 = 44.8 |
| R 4 = 1.780 | D 4 = 0.23 | | |
| R 5 = 1.981 | D 5 = 0.30 | N 3 = 1.846660 | ν 3 = 23.8 |
| R 6 = 3.928 | D 6 = Variable | | |
| R 7 = Aperture Stop | D 7 = Variable | | |
| * R 8 = 1.310 | D 9 = 0.50 | N 4 = 1.693500 | ν 4 = 53.2 |
| R 9 = −3.193 | D10 = 0.05 | | |
| R10 = −2.314 | D11 = 0.17 | N 5 = 1.567322 | ν 5 = 42.8 |
| R11 = 1.231 | D12 = 0.19 | | |
| R12 = 5.688 | D13 = 0.12 | N 6 = 1.846660 | ν 6 = 23.8 |
| R13 = 1.620 | D14 = 0.50 | N 7 = 1.772499 | ν 7 = 49.6 |
| R14 = −2.796 | D15 = Variable | | |
| * R15 = 3.786 | D16 = 0.33 | N 8 = 1.583130 | ν 8 = 59.5 |
| R16 = −23.999 | D17 = Variable | | |
| R17 = ∞ | D18 = 0.72 | N 9 = 1.516330 | ν 9 = 64.2 |
| R18 = ∞ | | | |
| #Focal length | 1.00 | 1.89 | 3.00 |
| Variable distance # | | | |
| D 6 | 2.63 | 0.68 | 0.25 |
| D 7 | 0.96 | 0.64 | 0.13 |
| D15 | 0.81 | 2.08 | 3.45 |
| D17 | 0.54 | 0.31 | 0.06 |

Aspheric coefficients
R2 k = 0.00000e + 00 B = −2.74990e − 02 C = −1.95531e − 02 D = −9.69365e − 03
E = −6.49331e − 03
R8 k = 0.00000e + 00 B = −3.32754e − 02 C = 8.56558e − 03 D = 0.00000e + 00
E = 0.00000e + 00
R15 k = 0.00000e + 00 B = −3.96875e − 02 C = 2.56906e − 02 D = −7.01192e − 02
E = 5.66280e − 02

NUMERICAL EXAMPLE 5

Figure 17:
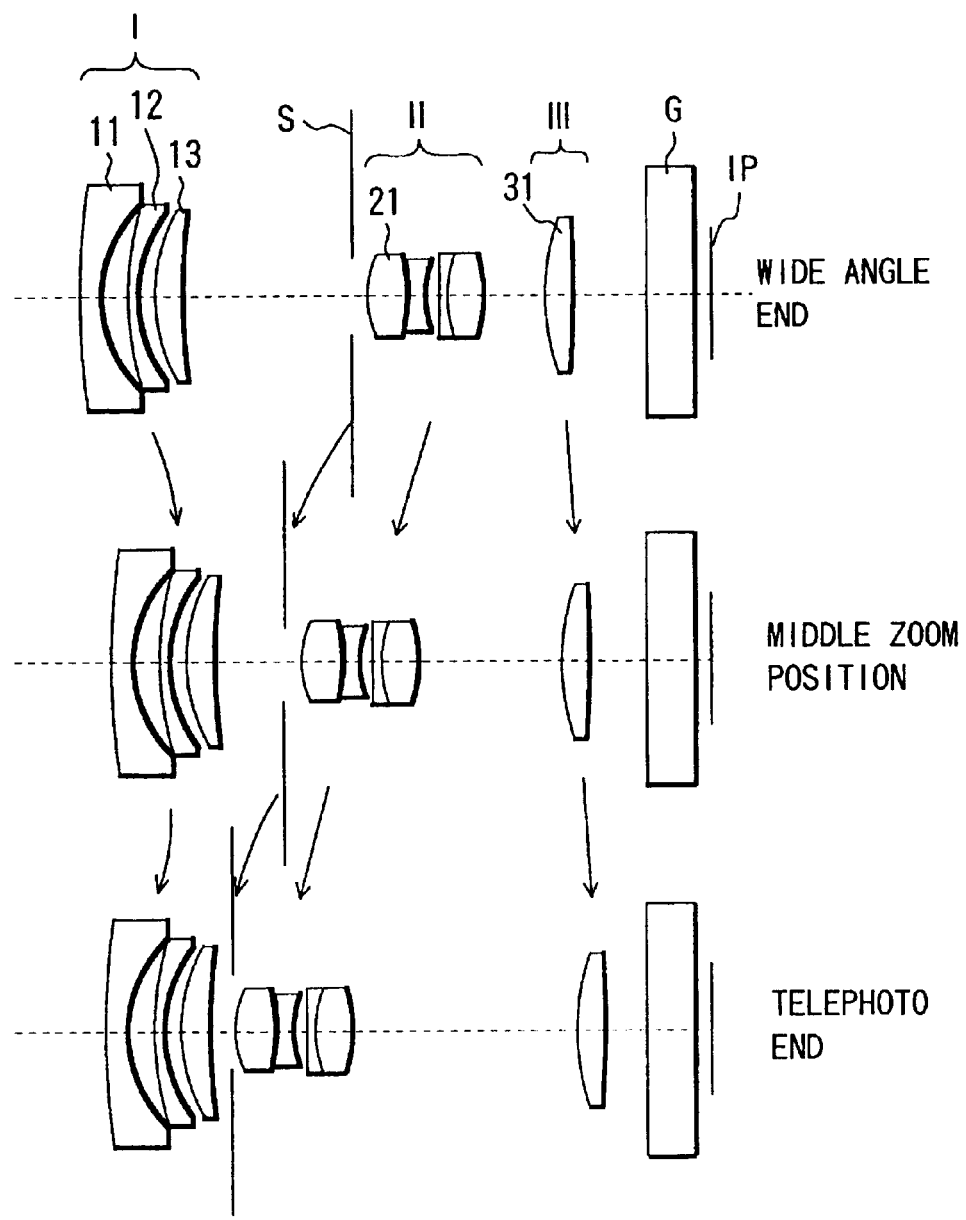
FIG. 17 shows a cross section of lenses in the zoom lens of another embodiment (Numerical Example 5) of the invention.
Figure 18:
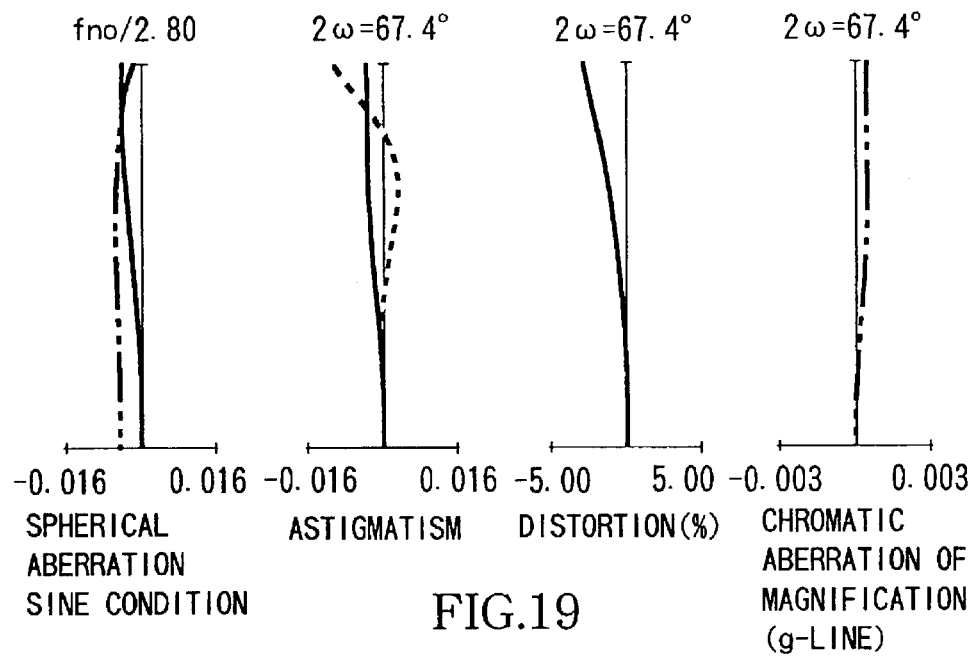
FIG. 18 shows aberrations of the zoom lens of FIG. 17 at the wide angle end.
Figure 19:
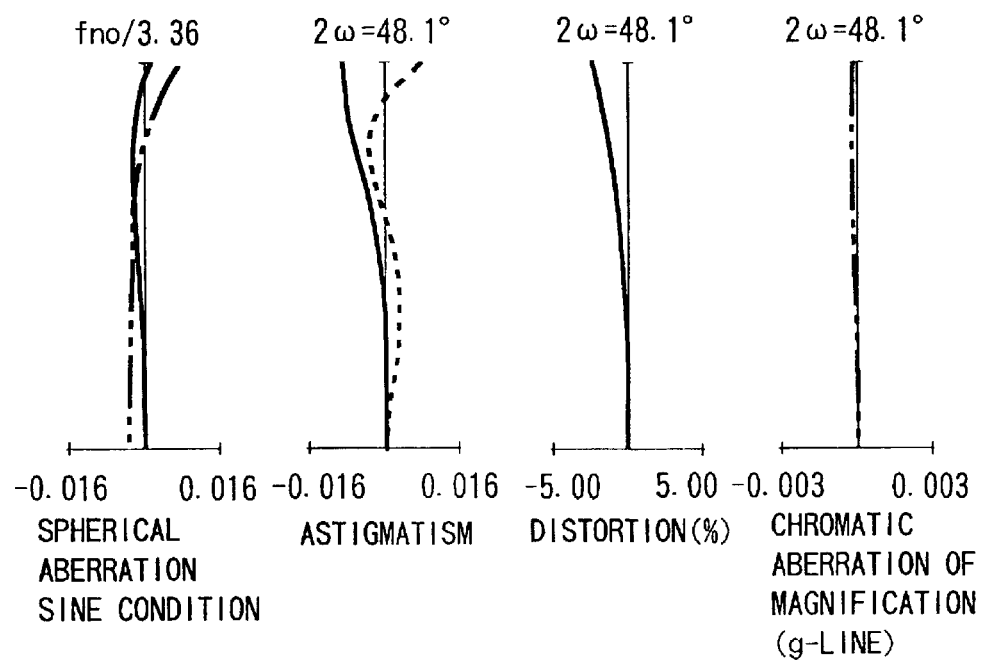
FIG. 19 shows aberrations of the zoom lens of FIG. 17 at a middle zoom position.
Figure 20:
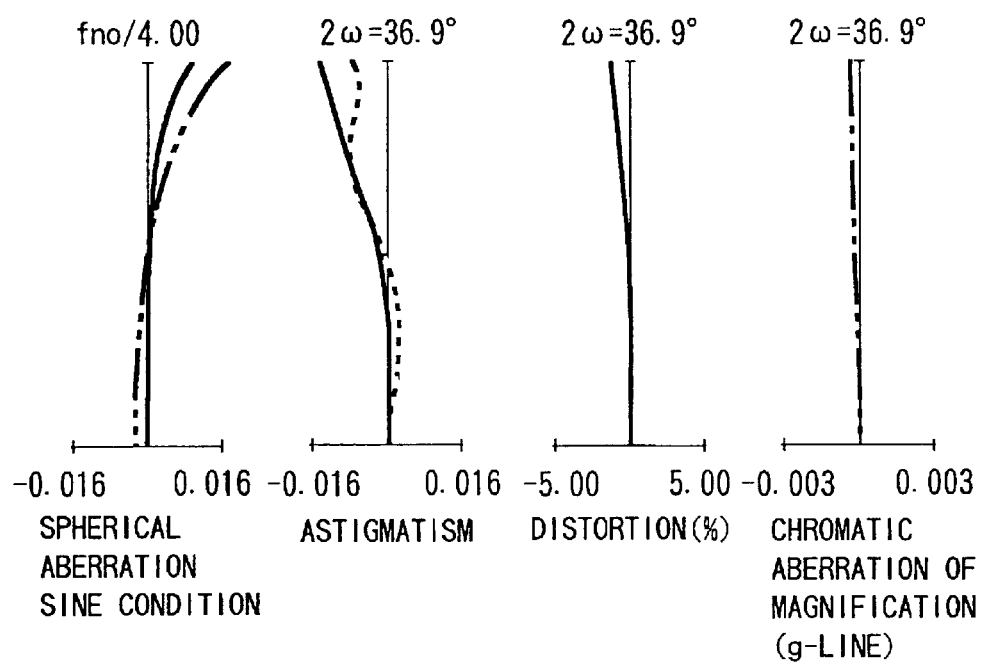
FIG. 20 shows aberrations of the zoom lens of FIG. 17 at the telephoto end.

FIG. 17 shows a cross section of lenses in the zoom lens of Numerical Example 5. FIGS. 18 through 20 show aberrations of the zoom lens of Numerical Example 5 at the wide angle end, in a middle zoom position and at the telephoto end, respectively.

In this Numerical Example, in zooming from the wide angle end to the telephoto end, the first lens unit I reciprocates in a convex shape toward the image side; the second lens unit II moves toward the object side; the third lens unit III moves toward the image side; and the aperture stop S moves toward the object side. The spacing between the first lens unit I and the aperture stop S varies to become narrower, the spacing between the aperture stop S and the second lens unit II varies to become narrower, and the spacing between the second lens unit II and the third lens unit III varies to become wider.

Lens data are shown below.

| | | | |
|---|---|---|---|
| f = 1 – 2.00 | Fno = 2.80 – 4.00 | 2ω = 67.4° – 36.9° | |
| R 1 = 7.625 | D 1 = 0.21 | N 1 = 1.674700 | ν 1 = 54.9 |
| * R 2 = 1.032 | D 2 = 0.25 | | |
| R 3 = 2.876 | D 3 = 0.10 | N 2 = 1.728250 | ν 2 = 28.5 |
| R 4 = 1.337 | D 4 = 0.16 | | |
| R 5 = 1.581 | D 5 = 0.29 | N 3 = 1.846660 | ν 3 = 23.8 |
| R 6 = 6.249 | D 6 = Variable | | |
| R 7 = Aperture Stop | D 7 = Variable | | |
| * R 8 = 1.012 | D 9 = 0.38 | N 4 = 1.693500 | ν 4 = 53.2 |
| R 9 = –4.616 | D10 = 0.03 | | |
| R10 = –1.688 | D11 = 0.14 | N 5 = 1.516330 | ν 5 = 64.1 |
| R11 = 0.958 | D12 = 0.13 | | |
| R12 = 11.676 | D13 = 0.08 | N 6 = 1.846660 | ν 6 = 23.8 |
| R13 = 0.974 | D14 = 0.35 | N 7 = 1.772499 | ν 7 = 49.6 |
| * R14 = –1.596 | D15 = Variable | | |
| R15 = 2.569 | D16 = 0.25 | N 8 = 1.583130 | ν 8 = 59.5 |
| R16 = –15.834 | D17 = Variable | | |
| R17 = ∞ | D18 = 0.48 | N 9 = 1.516330 | ν 9 = 64.2 |
| R18 = ∞ | | | |
| #Focal length | 1.00 | 1.44 | 2.00 |
| Variable distance # | | | |
| D 6 | 1.61 | 0.69 | 0.24 |
| D 7 | 0.16 | 0.17 | 0.02 |
| D15 | 0.61 | 1.37 | 2.19 |
| D17 | 0.71 | 0.56 | 0.39 |

Aspheric coefficients
R2 k = 0.00000e + 00 B = –9.96885e – 02 C = –6.04851e – 02 D = –1.68705e – 02
E = –9.96772e – 02
R8 k = 0.00000e + 00 B = –3.99941e – 02 C = 9.49301e – 03 D = 0.00000e + 00
E = 0.00000e + 00
R15 k = 0.00000e + 00 B = –2.93506e – 02 C = 1.35493e – 01 D = –3.10661e – 01
E = 2.61388e – 01

The embodiments of the present invention so far described have the advantage of providing a zoom lens in which the exit pupil at the wide angle end is kept sufficiently far from the image plane, and variations in exit pupil are reduced in the process of zooming including a middle zoom position, and which is suitable for a pickup apparatus using a solid-state image pickup element. There is another advantage that a compact zoom lens with a reduced front lens diameter can be provided.

Next will be described an embodiment of image pickup apparatus (digital still camera) provided with the above-described zoom lens with reference to FIGS. 21(A) and 21(B).

Figure 21:
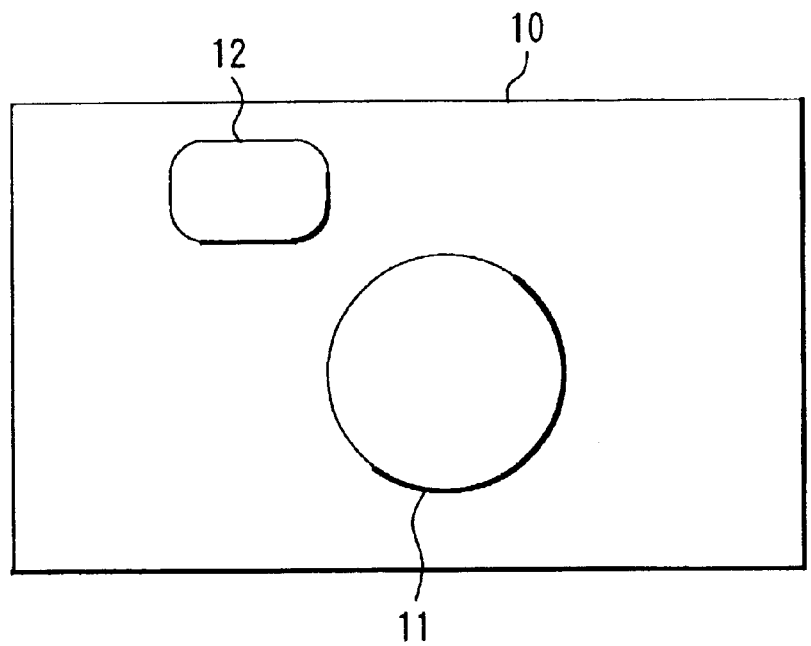
FIG. 21 is a schematic diagram of a digital still camera.
Figure 21:
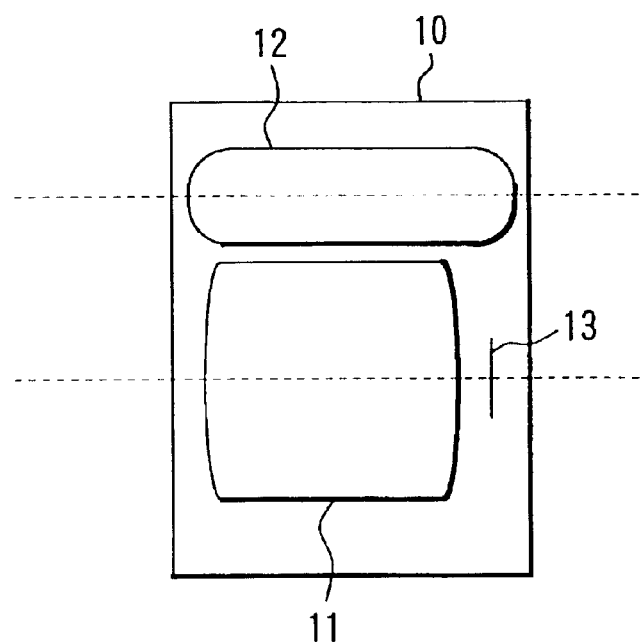

FIG. 21(A) shows a front view, and FIG. 21(B), a sectional profile, of the digital still camera. In the drawings, reference numeral 10 denotes the camera body (case); 11, an image pickup optical system using a zoom lens of one of Numerical Examples 1–5; 12, a view finder optical system; and 13, a solid-state image pickup element (photoelectric conversion element) such as CCD, CMOS sensor or the like. The solid-state image pickup element 13 receives the image of the subject formed in the image pickup optical system 11, and converts it into electrical information. The image information of the subject converted into electrical information is recorded in a memory not shown.

By applying the zoom lens of this embodiment to the image pickup optical system of the digital still camera, a compact image pickup apparatus can be realized.

While preferred embodiments have been described, it is to be understood that modification and variation of the present invention may be made without departing from the sprit or scope of the following claims.

What is claimed is:

1. A zoom lens comprising, in order from the object side toward the image side:
  a first lens unit having negative optical power, the first lens unit having a negative meniscus lens in which the concave surface is directed toward the image side and a positive meniscus lens in which the convex surface is directed toward the object side;
  an aperture stop;
  a second lens unit having positive optical power, the second lens unit having at least one positive lens and at least one negative lens, and
  a third lens unit having positive optical power, the third lens unit moving during zooming, wherein:
  the following distances are changed in said zoom lens during zooming such that; the distrance between said first lens unit and said aperture stop is narrower at the telephoto end than at the wide angle end, the distance between said aperture stop and said second lens unit is narrower at the telephoto end than at the wide angle end, and the distance between said second lens unit and said third lens unit is wider at the telphoto end than at the wide angle end; and
  the following condition is satisfied:

$$0<(Dw-Dt)/fw<1$$

where Dw is the distance between said aperture stop and said second lens unit at the wide angle end; Dt is the distance between said aperture stop and said second lens unit at the telephoto end; and fw is the focal length at the wide angle end.

2. The zoom lens according to claim 1, wherein:
  said aperture stop and said second lens unit move in loci satisfying the following condition, respectively:

$$MS2/MP2<MS1/MP1$$

where MS1 is the amount of movement of said aperture stop from the wide angle end to any position within the zoom range except for the wide angle and the telephoto end; MS2 is the amount of movement of said aperture stop from said any position within the zoom range to the telephoto end; MP1 is the amount of movement of said second lens unit from the wide angle end to said any position within the zoom range; and MP2 is the amount of movement of said second lens unit from said any position within the zoom range to the telephoto end.

3. The zoom lens according to claim 2,
  further satisfying the following condition:

$$0.4<MS/fw<1.8$$

where MS is the amount of movement of said aperture stop from the wide angle end to the telephoto end.

4. The zoom lens according to claim 1, wherein:
  said first lens unit, in zooming from the wide angle end to the telephoto end, moves in a convex locus toward the image side.

5. The zoom lens according to claim 1, wherein:
  the lens surface of said second lens unit closest to the object side is aspheric in a shape which is convex toward the object side and in which the convergent action weakens from the center toward the periphery.

6. The zoom lens according to claim 1, wherein:
  said third lens unit has a lens provided with an aspheric surface of a shape in which the convergent action weakens from the center toward the periphery.

7. The zoom lens according to claim 1, wherein:
said zoom lens forms an image on a photoelectric conversion element.

8. An image pickup apparatus comprising:
the zoom lens according to claim 1, and
a photoelectric conversion element for optically receiving the image formed by said zoom lens.

9. A zoom lens comprising, in order from the object side toward the image side:
a first lens unit having negative optical power, the first lens unit having a negative menisus lens in which the concave surface is directed toward the image side and a positive meniscus lens in which the convex surface is directed toward the object side;
an aperture stop;
a second lens unit having positive optical power, the second lens unit having at least one positive lens and at least one negative lens, and
a third lens unit having positive optical power, the third lens unit moving during zooming,
wherein:
the following distances are changed in said zoom lens during zooming such that; the distance between said first lens unit and said aperture stop is narrower at the telephoto end than at the wide angle end, the distance between said aperture stop and said second lens unit is narrower at the telephoto end than at the wide angle end, and the distance between said second lens unit and said third lens unit is wider at the telephoto end than at the wide angle end; and
the following condition is satisfied:

$$0<(Dw-Dt)/fw<1$$

where Dw is the distance between said aperture stop and said second lens unit at the wide angle end; Dt is the distance between said aperture stop and said second lens unit at the telephoto end; and fw is the length at the wide angle end.

10. The zoom lens according to claim 9, wherein:
said zoom lens forms an image on a photoelectric conversion element.

11. An image pickup apparatus comprising:
the zoom lens according to claim 9, and
a photoelectric conversion element for optically receiving the image formed by said zoom lens.

12. The zoom lens according to claim 1, wherein:
the following condition is satisfied:

$$0.62<(Dw=Dt)/fw<1.$$

13. A zoom lens comprising, in order from the object side toward the image side:
a first lens unit having negative optical power, the first lens unit having a negative meniscus lens in which the concave surface is directed toward the image side and a positive meniscus lens in which the convex surface is directed toward the object side;
an aperture stop, the aperture stop moving during zooming;
a second lens unit having positive optical power, the second lens unit having at least one positive lens and at least one negative lens, and
a third lens unit having positive optical power, wherein:
no optical member exists between the second lens unit and the third lens unit;
the following distances are changed in said zoom lens during zooming such that: the distance between said first lens unit and said aperture stop is narrower at the telephoto end than at the wide angle end, the distance between said aperture stop and said second lens unit is narrower at the telephoto end than at the wide angle end, and the distance between said second lens unit and said third lens unit is wider at the telephoto end than at the wide angle end; and
the following condition is satisfied:

$$0<(Dw-Dt)/fw<1$$

where Dw is the distance between said aperture stop and said second lens unit at the wide angle end; Dt is the distance between said aperture stop and said second lens unit at the telephoto end; and fw is the focal length at the wide angle end.

14. The zoom lens according to claim 13, wherein:
said zoom lens forms an image on a photoelectric conversion element.

15. An image pickup apparatus comprising:
the zoom lens according to claim 13, and
a photoelectric conversion element for optically receiving the image formed by said zoom lens.

* * * * *